Patented Feb. 12, 1924.

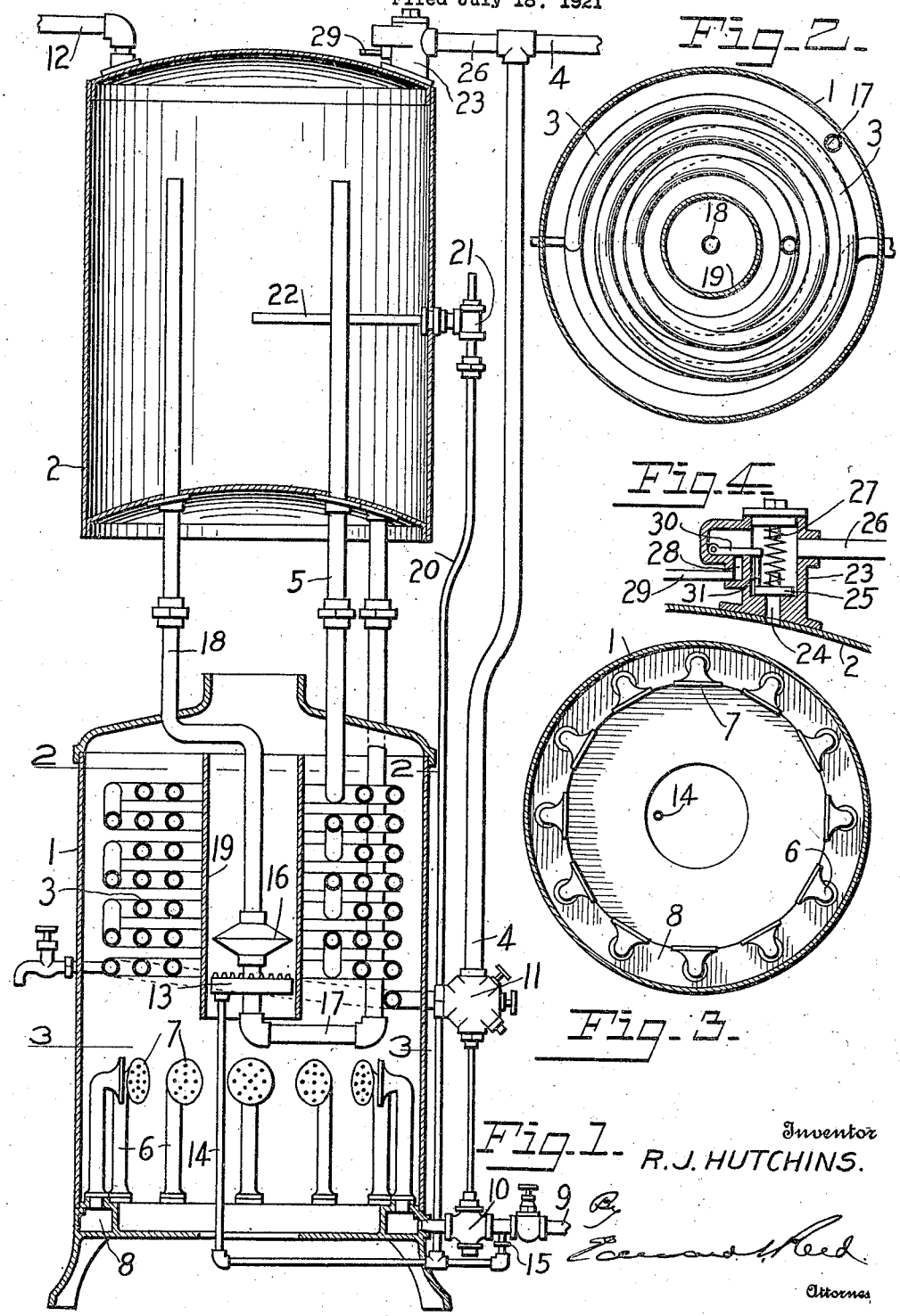

1,483,090

UNITED STATES PATENT OFFICE.

RUFUS J. HUTCHINS, OF MIDDLETOWN, OHIO.

WATER HEATER.

Application filed July 18, 1921. Serial No. 485,602.

*To all whom it may concern:*

Be it known that I, RUFUS J. HUTCHINS, a citizen of the United States, residing at Middletown, in the county of Butler and State of Ohio, have invented certain new and useful Improvements in Water Heaters, of which the following is a specification, reference being had therein to the accompanying drawing.

This invention relates to water heaters and more particularly to domestic water heaters.

One object of the invention is to provide a water heater which will maintain a supply of heated water ready for instant use and will replenish said supply with hot water as rapidly as it is drawn off.

Another object of the invention is to provide a heater comprising an automatic heating device and a tank heating element in which the pilot burner of the automatic heating device will supply the heat for the tank heating element.

A further object of the invention is to provide such a heater with means for automatically supplying additional heat to the tank heating element when the temperature of the water in the tank falls below a predetermined degree.

A further object of the invention is to provide a water heater with an automatic heating element, the coils of which will be so arranged as to utilize the heat from the burner to the best possible advantage.

Other objects of the invention will appear as the device is described in detail.

In the accompanying drawings Fig. 1 is a vertical sectional view taken centrally through a heater embodying my invention; Fig. 2 is a section taken on the line 2—2 of Fig. 1; Fig. 3 is a section taken on the line 3—3 of Fig. 1; and Fig. 4 is a sectional detail view of the relief valve.

In these drawings I have illustrated one embodiment of my invention and have shown the same as comprising a casing 1 and a tank 2 which is arranged and supported in any desired manner with relation to the casing. Arranged within the casing is an automatically controlled heating device comprising a plurality of superimposed coils 3 each of which may consist of one or more windings. This heating device is connected with a source of water supply, such as a pipe 4, and with the tank, the connection with the tank in the present instance being formed by a pipe 5 connected with the upper heating coil and leading through the top of the casing into the tank and communicating with the tank near the upper end thereof. The water in the heating element, consisting of superimposed coils 3, is heated by a burner 6, here shown as comprising a series of burner heads 7 connected with an annular conduit 8 arranged in the lower part of the casing and connected with a gas supply pipe 9. The flow of gas to the burner is controlled by an automatic valve 10 which is normally closed and which is adapted to be opened to admit gas to the burner when water is withdrawn from the tank. This automatic control may be of any known or suitable character and is here shown at 11 as of a well known character and is so constructed that when a faucet is opened in the distributing system, the device 11 will act upon the valve 10 to open the same, it being noted that the tank 2 is connected at its upper end with a distributing pipe 12 which leads to the faucet or faucets of the distributing system. Inasmuch as this automatic controlling device is of known construction and forms no part of the present invention it is not thought necessary to shown or describe the same in detail. The burner 6 is provided with a pilot burner which ignites the gas when the valve 10 has been opened and in the present construction this pilot burner is shown at 13 and is connected by a pipe 14 with the gas supply pipe 9 on the outer side of the automatic valve 10 so that a constant supply of gas will be furnished to the pilot burner, this supply being regulated by a valve 15.

With an automatic heating device such as has been described, it is necessary to draw off the water in the distributing system and in the upper portion of the coil before hot water will be delivered at the faucet, thus causing a delay in securing hot water and also causing a waste of water. To avoid this I have interposed the tank 2 between the automatic heating element and distributing system and have provided means for maintaining in the tank a constant supply of hot water. To accomplish this I have arranged within the casing 1 a tank heating element which may be of any suitable character but which is here shown as a circular receptacle 16 having its upper and lower walls converging outwardly and which is connected by a pipe 17 with the lower portion of the tank 2 and by a pipe 18 with the upper portion of the tank 2, so that when heat is applied to the heating element 16 the water in the tank will circulate through the heating element and be heated. Heat is applied to the heating element 16 continuously under normal conditions and I have, in the present instance, utilized the pilot burner 13 for the main burner of the automatic heater as the burner for the heating element. The pilot burner is shown as extending about the pipe 17 so as to apply heat to the various portions of the lower surface of the heating element. Preferably both the heating element and the burner are enclosed in a housing 19 which is open at its upper and lower ends and, in the present instance, this housing and the heating element are arranged within the coils of the automatic heating element, although it must be understood that these parts may be arranged in any suitable relation.

When the automatic heater remains inoperative for a relatively long period of time it may be that the heat from the pilot burner 13 will be insufficient to maintain the water in the tank 2 at the desired temperature and to take care of this situation I have provided means for automatically applying additional heat to the tank heating element when the temperature of the water in the tank falls below a predetermined temperature. This may be accomplished in various ways but instead of providing an additional burner I have, in the present instance, provided means for supplying additional gas to the pilot burner. For this purpose I have connected with the supply pipe 14 of the pilot burner, an auxiliary gas pipe 20 which is controlled by a thermostatically operated valve, which is shown at 21, and which is connected with a thermostat 22 extending into the tank 2. The valve and the thermostat 22 may be of any suitable construction and it is not necessary to either describe or illustrate in detail these parts of the mechanism as they may be of a well known construction. It is sufficient to note that the thermostat 22 will act to open the valve 21 and admit additional gas to the pilot burner when the temperature of the water falls below a predetermined degree. When the temperature of the water has been restored to the desired degree the valve 21 will be again closed and the pilot burner will receive its normal supply of gas from the pipe 9.

In order that the coils of the automatic heater may utilize the heat from the burner 6 to the best possible advantage I have so arranged the superimposed coils that the windings of an upper coil will cross the spaces between the windings of the next lower coil, thus exposing the upper coil more directly to the flame and heat from the burner. In the present instance this is accomplished by winding the alternate coils in opposite directions, as shown in Fig. 2.

It is desirable that some means should be provided to relieve the pressure in the tank 2 in case excessive heat should generate any considerable amount of steam therein and I have, therefore, mounted on the tank a relief valve comprising a casing 23 having a chamber which communicates with the interior of the tank through a port 24 and in which is mounted a valve member 25 to control the port 24. The valve chamber is connected on the outer side of the valve member 25 with the water pressure line 4, the latter being provided with a branch 26 which is tapped into the casing 23. Inasmuch as the pressure in the tank is normally substantially equal to the pressure in the water supply line the pressure on the valve 25 will be substantially balanced and a light spring 27 will serve to hold the valve 25 seated but will permit the same to open under any excess of pressure in the tank. The steam escaping through the port 24 and about the valve 25 may escape into the water line 26 as the pressure of the steam will be greater than the pressure of the water, but I prefer to provide other means for the escape of steam. I have, therefore, shown the casing as having an outlet port 28 connected with a pipe 29 which may lead to a drain, or other suitable source of discharge. This port is controlled by a valve 30 which is held normally on its seat by the pressure of the water in the valve chamber and which will be opened by the valve 25 when the latter is opened. In the present instance the valve 25 has connected therewith a pin 31 which engages the edge of the valve 30. Consequently, when the valve 25 is unseated by the pressure in the tank the valve 30 will also be opened and the steam can escape through the valve chamber to the pipe 29. By utilizing the pressure of the water in the supply line to control these valves I provide an automatic relief valve which is very positive in its operation as a light spring can be utilized and it is not necessary that any fine adjustments of the spring or other parts should be made.

It will be apparent from the foregoing description that I have provided a water heater which will not only maintain a constant supply of hot water ready for instant use upon the opening of the faucet, but that I have provided automatic means for supplying the tank with additional heated water in unlimited quantities so that upon the opening of the faucet hot water will be instantly secured, unless the faucet is located at a great distance from the tank, and that this supply of heated water will be constantly maintained as long as the faucet remains open.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a water heater, a tank, a heating element connected with said tank and comprising a plurality of superimposed coils, a burner arranged beneath said heating element, means to automatically control said burner, a casing arranged within the coils of the first mentioned heating element, a second heating element arranged wholly within said casing and having circulating connection with said tank, and a burner for said second heating element.

2. In a water heater, a tank, a heating element connected with said tank and comprising a plurality of superimposed coils, a burner arranged beneath said heating element, means to automatically control said burner, a casing arranged within the coils of the first mentioned heating element, a second heating element arranged wholly within said casing and having circulating connection with said tank, and a normally operative burner for said second heating element.

3. In a water heater, a tank, a heating element connected with said tank and comprising a plurality of superimposed coils, a burner arranged beneath said heating element, means to automatically control said burner, a casing arranged within the coils of the first mentioned heating element, a second heating element arranged within said casing and having circulating connection with said tank, and a burner for said second heating element also arranged within said casing.

4. In a water heater, a tank, a heating element connected with said tank, a burner for said heating element, an automatically controlled valve to control the supply of gas to said burner, a pilot burner for said automatically controlled burner, a second tank heating element having circulating connection with said tank and arranged adjacent to said pilot burner whereby said pilot burner will operate to heat the water in said tank, and automatically controlled means to supply additional heat to said second tank heating element.

5. In a water heater, a tank, a heating element connected with said tank, a burner for said heating element, an automatically operated valve to control the supply of gas to said burner, a tank heating element having a circulating connection with said tank, a normally operative burner for said tank heating element to maintain a constant circulation of water in said tank, and automatically controlled means to supply additional gas to said normal operative burner.

6. In a water heater, a heating element connected with said tank, a burner for said heating element, an automatically operated valve to control the supply of gas to said burner, a tank heating element having circulating connection with said tank, a normally operative burner for said tank heating element to cause a constant circulation of water from said tank to said tank heating element, a pipe to supply gas to said normally operative burner independently of the first mentioned burner, and means controlled by the temperature in said tank to control the flow of gas through said pipe to said normally operative burner.

In testimony whereof I affix my signature hereto.

RUFUS J. HUTCHINS.